UNITED STATES PATENT OFFICE.

JAMES V. POMEROY, OF BOULDER, COLORADO.

EXTRACTING GOLD AND SILVER FROM ORES.

SPECIFICATION forming part of Letters Patent No. 233,799, dated October 26, 1880.

Application filed November 10, 1879.

*To all whom it may concern:*

Be it known that I, JAMES V. POMEROY, of Boulder, in the county of Boulder and State of Colorado, have invented an Improvement in Extracting Gold and Silver from Ores, of which the following is a specification.

The object of my invention is to work the refractory ores for the purpose of securing the gold and silver contained in them by using both chlorine gas and mercury, each of them having proved ineffective separately.

As the ores are now worked, they must not contain much base metal, and require to be subjected to what is known as a "dead-roast." The purpose of the latter is to leave no appreciable sulphates, which tend to reduce the chloride of gold to metal as fast as the gas acts, and render necessary an excessive quantity of gas to recover the gold.

When coarse gold is present the time and gas required to reduce it, the liability to loss, the large space in the tank required for precipitation, and the expensive attendance, together with the difficulty of getting a dead-roast, render the usual processes of chlorination impracticable with refractory ores of a low grade. My aim has been to obviate these difficulties.

I first pulverize the ore, and, if necessary, subject it to an ordinary roast, then reduce it to a flour or put it at once into the amalgamating-pan. It is then ground with a suitable quantity of mercury, and into the pulp is introduced chlorine gas or chloride of lime and acid to produce the gas. Without the gas very little amalgamation would take place, while the sulphates would make it flour and so foul that it would be difficult to recover the mercury.

By means of the gas the mercury becomes very sensitive and attaches everything of a metallic nature, while the metals themselves are made bright and clean, so as to be readily absorbed by the mercury.

If the ore does not contain copper, I add a small proportion to keep the mercury clean.

The first first effect of the amalgamation is a conglomeration of everything in the pan adhering to the outer surface of the mercury. Hence the amalgamation process must be continued until the mercury has absorbed or has incorporated into itself what at first only adhered to its surface. When all particles of mercury will readily come together in a mass and show a clean surface it will have absorbed all the metals. The pulp can then be thinned down.

My invention possesses the following advantages: I have little expense in roasting the ore, save much labor in handling it, economize room in the settling-tanks, render unnecessary the employment of skilled and high-priced workmen, diminish the whole cost about two-thirds, and am able to operate upon a much lower grade of ore.

I may either use the chlorine gas or a small percentage of the chloride of lime with sufficient acid to liberate the gas. This, if desired, may be charged into the pulp in the amalgamating-pan or in a separate vessel.

I am aware that a solution of chloride of sodium has been used in connection with the mercury for amalgamating purposes; but as this mixture does not produce chlorine gas, it would not answer my purpose.

I also disclaim chloridizing or chlorinating ores, where the object is leaching and precipitation, and introducing chlorine gas or chloride of lime to facilitate the production of chlorine gas under pressure in the leaching process.

The object of my subprocess is to operate on refractory ores containing both gold and silver, and with it I have worked, at a very handsome profit, ores that under the ordinary processes would not pay at all.

I am aware that sulphate of copper and salt or chloride of sodium have been employed with ores containing silver; but salt or a solution of salt has no perceptible effect on refractory ores.

I use the chlorine gas from the generator, charging with it the water that is used to wet the pulp; but as chloride of lime, with an acid to liberate the gas, is so much more effective, as well as cheaper, I give it the preference.

I use chlorine because the ores contain sulphur in the form of iron and copper sulphurets, which form a soluble sulphate of iron and copper that causes the mercury to flour and have but little affinity for the gold and silver in the ore. The chlorine seems to arrest this tendency in the mercury to flour and to attach promptly the metals that are in the pulp.

What I claim as new is—

The process herein described of amalgamating ores containing gold and silver, which consists in introducing chlorine gas or chloride of lime with an acid into the pulverized ore with the mercury, for the purpose specified.

JAMES V. POMEROY.

Witnesses:
OSCAR F. GUNZ,
C. SEDGWICK.